Patented Dec. 12, 1939

2,183,044

UNITED STATES PATENT OFFICE 2,183,044

METHOD OF TREATING SILICON CARBIDE GRAINS

Abraham Albert Klein, Worcester, Mass., assignor to Norton Company, Worcester, Mass., a corporation of Massachusetts No Drawing. Application February 19, 1938, Serial No. 191,469

7 Claims. (Cl. 51—278)

This invention relates to silicon carbide grain and to methods of treating the same, and particularly for the purpose of strengthening the grain and giving it a longer life of useful service in polishing and cutting operations.

Silicon carbide is made by electrosynthesis, whereby a charge of silica and carbon is heated in an electric resistance furnace to a high temperature at which the product is formed and crystallized as a massive ingot which is later crushed to a granular condition and then screened to separate it into its various grit sizes. The following typical analysis of a standard commercial silicon carbide indicates that it is substantially pure:

| | Per cent by weight |
|---|---|
| SiC | 97.71 |
| Si | 0.46 |
| SiO₂ | 0.86 |
| C (free) | 0.17 |
| Fe | 0.24 |
| Al | 0.32 |
| CaO | 0.17 |
| MgO | 0.08 |

Among other uses, this granular material is employed as a coating on a flexible backing or in a loose condition as well as in bonded shapes, and it has especial adaptability for grinding or polishing glass or marble, granite and other natural stones or for cutting letters or forms in such stone material. The silicon carbide is ordinarily required in certain definite grit sizes; but if the operation is too severe the grains may become crushed to smaller sizes or fail to stand up as needed, with a resultant change in cutting ability and decrease in efficiency of operation.

The primary object of this invention is to treat silicon carbide in such a manner as to cause the individual grains to act stronger and to have a greater resistance to the crushing forces of a cutting, blasting or polishing operation and otherwise to improve its abrading qualities and make it more efficient and longer lived.

A further object is to provide articles made from the treated grains which will have a high resistance to the stresses of abrading operations. Other objects will be apparent in the following disclosure.

In accordance with this invention, I propose to subject silicon carbide to a heat treatment which will strengthen it and impart desired properties thereto. This treatment comprises the step of heating the individual grains to a temperature above 1000° C., and particularly within the range of 1050° C. to 1200° C., and under such time and temperature conditions as will materially improve the silicon carbide for specified uses. For the best results, the grain is heated at a temperature in the neighborhood of 1150° C. for a period of at least one hour, and it is cooled at such a slow rate as to cause the material to be annealed and prevent strains being set up within the grain, and to impart desired physical properties thereto. If desired, this heat treatment may also be followed by a chemical treatment, which may particularly comprise heating the grain after it has been wet with an aqueous solution of caustic alkali, and particularly sodium or potassium hydroxide.

The nature of this invention will be more readily apparent from an inspection of the following table which shows the results of special heat treatments applied to silicon carbide grains of different grit sizes.

Table No. I

| Grain size | Not heated, original strength | 1050° C. | | 1100° C. | | 1150° C. | |
|---|---|---|---|---|---|---|---|
| | | Strength | Per cent increase | Strength | Per cent increase | Strength | Per cent increase |
| 20 | 18.5 | 24 | 30 | 27.0 | 46 | 29.5 | 60 |
| 36 | 33 | 47 | 42.5 | 47.5 | 44.0 | 51.5 | 56 |
| 50 | 56.5 | 65.5 | 16 | 67.5 | 20 | 70.5 | 25 |
| 80 | 61 | 75.5 | 24 | 75.5 | 24 | 75.0 | 23 |
| 90 | 58 | 80 | 38 | 80.0 | 38 | 80.8 | 39 |
| 100 | 75.4 | 84.5 | 12.0 | 84.5 | 12.0 | 83.5 | 11 |

In the above table, the first column gives the average size of the grains as the number of meshes per linear inch in a wire screen through which the grains will just pass. The second column in this table gives the strength of the untreated grains. This is determined by means of a centrifugal machine which hurls a mass of grains against a stationary wall and breaks some of them down to smaller sizes. The strength measurement is the percentage of grains which remain unbroken. The three coarse grit sizes were passed through the machine but once, while the three finer sizes were given five passes before the strength measurement was determined. The third, fifth and seventh columns give the average strength of the grains when heated respectively to 1050° C. for 1 hour, 1100° C. for 1 hour and 1150° C. for 10 hours. The remaining columns give the approximate percentage increase of strength. That is, the No. 20 grit size had an original strength of 18.5, and heating the grain for 1 hour at a temperature of 1050° C. gave it a strength of 24 or about 30% increase in strength. Similarly, the same grain heated at 1100° C. for one hour had a strength of 27 or an increase of 46%. A heat treatment for 10 hours at 1150° C. gave a strength of 29.5 or a percentage increase of 60.

It is found that the strength of the finer sizes of grain is greatly improved at a temperature of 1050° C. to 1100° C., while the coarser grains are given their maximum strength above 1100° C. or in the vicinity of 1150° C. A temperature above 1200° C. does not materially improve the grain and, in fact, the grain strength may decrease slightly at a temperature above 1150° C. although the grain is much stronger than if not heat treated. This is shown in the following Table No. II giving the grain strengths for different temperatures of treatment, wherein a batch of 36 grit size silicon carbide grains of special chunky or equidimensional grain shape was treated at a temperature ranging from 300° C. to 1400° C.

*Table No. II*

| Temperature of heat treatment | Strength |
| --- | --- |
| Unheated | 59 |
| 300° C | 59 |
| 475° C | 60 |
| 700° C | 64 |
| 925° C | 66 |
| 1150° C | 74 |
| 1270° C | 72 |
| 1400° C | 72 |

It is not ordinarily satisfactory to merely raise the material to a given temperature and then cool it quickly. I find that it is desirable to soak the material at the required temperature for a period of about one to ten hours. The strength of the grain increases very rapidly during the first hour of that soaking period. Thereafter, the improvement increases less rapidly, and at the end of ten hours or so the grain has reached substantially its maximum strength. The heat treatment may however be stopped at the end of about an hour if further heating does not present economic advantages.

A further important consideration is that the grain shall not be cooled abruptly and quickly. This is indicated by the following Table No. III giving a comparison of the strengths of grains cooled quickly in air and cooled slowly through a period of several hours in a closed furnace, after each had been subjected to the same treatment of being heated at 1150° C. for ten hours.

*Table No. III*

| Grit size | Original strength | Strength fast cooled | Per cent increase | Strength slowly cooled | Per cent increase |
| --- | --- | --- | --- | --- | --- |
| 20 | 18.5 | 25.5 | 38 | 29.5 | 60 |
| 36 | 60 | 74 | 23 | 77 | 28 |

The 20 grit size grain had a shape involving a low strength, while the 36 grit was initially chunky and strong. The data shows that the step of cooling each type of grain increased its strength materially. This is believed to be due to the fact that the slow cooling serves as an annealing operation and so prevents strains being set up in the heated grain, as is the case in the step of air cooling the grain, in which the grain is taken from the furnace and allowed to cool very quickly in the open air. If such strains are set up within the crystal structure, these are released under the impacts and pressures of a grinding operation and so cause the grain to fracture more readily. It is further found that the cooling step should take at least 1 hour and that it is beneficial to employ a much slower rate, such as would be had if the grain were permitted to remain within the kiln after the heat had been shut off and to take at least 24 hours to come to about room temperature. A tunnel kiln will give a satisfactory treatment for both the heating and the cooling stages. Hence, the treatment involves soaking the grain for a period of at least one hour, and preferably for several hours, at a temperature about 1000° C. and preferably near 1150° C., and then slowly cooling it throughout a long period of time of at least one hour and preferably for several hours. This treatment is ordinarily carried on in an oxidizing atmosphere, although if desired an inert or reducing atmosphere may be employed.

The grain as thus produced has a substantially smooth, non-pitted lustrous surface, and it presents an iridescent appearance when heated in an oxidizing atmosphere at temperatures above 1050° C., but this peculiar color property is not noticeable below that temperature. The iridescence is due to the formation of a thin film of silica on the surface of the grain by the chemical oxidation of the silicon carbide. This coating may be removed by treating the grain with caustic alkali, such as sodium or potassium hydroxide, or other equivalent chemical, such as hydrofluoric acid. This may be accomplished by boiling the grain in a 20% aqueous solution of sodium hydroxide which results in the film being completely removed in about fifteen minutes. A 10% solution of NaOH requires about three hours for removal of the film. The removal of the coating by such a chemical treatment does not reduce the grain strength, and the grain retains its smooth lustrous surface.

An article of silicon carbide abrasive of 36 grit size bonded with a glue and having a structure made of 60% by volume of abrasive, 6% of glue and 34% of pores was found to have a tensile strength of 428 pounds per square inch when untreated grain was used, while the strength of an article made of grain heat treated at 1150° C. was 470 pounds per square inch. Hence the heat treatment of the abrasive grain has materially improved its bonding properties and the resultant strength of the final product.

The grain as thus heat treated has been found to give exceptional results in the industry of polishing and cutting granite in that the material stands up better and cuts longer and more efficiently than does the untreated grain. Likewise, in the work of air blasting letters on a granite monument, a given grain size acts as if it were a coarser grain or as if it were much stronger. That is, one may use a finer grain size for a given operation and attain the results of the coarser grains. The same results are found in the operations of rough grinding lenses and bevelling or edging plate glass, wherein it is necessary that the grains have a long life and do not crush down to smaller sizes too readily. The smaller heat treated grain has a longer life than has a similarly sized untreated grain.

It may also be observed that the iridescent film has heretofore been occasionally noted on the abrasive ingot as it comes from the electric furnace, which has a temperature far in excess of that employed in the present heat treatment. However, when the abrasive crystals of the ingot are crushed, this iridescence virtually disappears owing presumably to the fact that it is originally found only on the surfaces of the crystals of the ingot and does not appear on the fracture surfaces of the grains produced by the crushing operation. This heat treatment in the present case gives a uniform iridescent color to all surfaces of the grains and thus characterizes the grains as distinct in their appearance and physical nature over those made in accordance with the prior art practice.

It should be appreciated that this invention relates to the treatment of abrasive grain, especially after the ingot made in the electric furnace has been crushed to comparatively small sizes, such as are used in the commercial abrasive industries. The temperature of treatment is, moreover, maintained so low, and preferably between 1000° C. and 1400° C., that the grain is not caused to recrystallize and lose its initial grain shape. The atmospheric conditions and the temperature as well as duration of the heat treatment are also so controlled, as above described, that serious oxidation of the grains is prevented.

A satisfactory method of treating the material involves placing it in saggars or other receptacles, which prevents agitation or mulling the grains and limits the opportunity for oxidation, and then heating it in a standard ceramic periodic kiln. The material may also be placed on cars and passed slowly through a tunnel kiln in which the temperature gradient rises gradually to a maximum and is there held for the required length of time, after which it slowly drops in the kiln through an annealing period to a temperature at which detrimental strains will not be set up within the grains due to a more rapid cooling. Various expedients well known in the abrasive industry may be adopted for the purpose of heat treating these grains.

The silicon carbide grain as thus treated is especially adapted for use as an abrasive coating on a flexible backing, such as paper or cloth. A layer of the grains may be cemented in position by means of a coating of glue, resinoid or the standard bonds used in the industry. For certain uses, the iridescent grains with the silica coatings are especially desirable, and the flexible abrasive article gives a long life of useful surface due to the improved strength of the abrasive and to the apparently stronger bonding action or the adhesion of the grain to the glue or other bond in which it is embedded. I may also employ on flexible backings the grains which have been chemically treated to remove the silica film. The greater strength of the grain is readily apparent in its cutting action in either case.

It will be understood in view of the above disclosure that this invention relates primarily to silicon carbide grains, the major portion of which will pass through a screen of 4 meshes to the linear inch, and that these grains are of the commercial grit sizes required in the industry. In particular, the grain is in its final shape and grit size when subjected to the strengthening heat treatment. It, therefore, is to be understood that the above description of this process and the products made thereby is illustrative of the general principles involved in the invention as well as the preferred manner of accomplishing the same, but the invention is not to be interpreted as being limited otherwise than is set forth in the claims appended hereto.

What I claim as new and desire to secure by Letters Patent is:

1. The method of treating silicon carbide grains and improving the strength thereof, comprising the steps of heating the grains in a substantially pure condition and holding the same at a temperature between 1000° C. and 1400° C. for a considerable time, while limiting the oxidation so as to produce substantially smooth, non-pitted, lustrous surfaces, and thereafter cooling the same slowly to anneal the grains and prevent detrimental strains being set up therein.

2. The method of treating silicon carbide grains comprising the steps of heating a mass of the grains and holding them for a soaking period of at least one hour at a temperature between 1050° C. and 1200° C., while limiting the oxidation thereof to produce substantially smooth, non-pitted grains having lustrous surfaces, then cooling the material slowly in the heating furnace through an annealing period to prevent detrimental strains being set up therein.

3. The method of treating silicon carbide grains comprising the steps of heating the material in a substantially pure condition to a temperature in the vicinity of 1050° C. to 1150° C. for a period of several hours until the strength thereof has been materially increased and with limited oxidation thereof to produce grains having smooth, non-pitted, iridescent surfaces, and thereafter cooling the mass slowly in the furnace for at least one hour through an annealing period and preventing detrimental strains being set up therein.

4. The method of treating silicon carbide grains comprising the steps of heating substantially pure silicon carbide grains to a temperature between 1000° C. and 1400° C. and for a considerable period of time which results in strengthening the grains materially, while limiting the oxidation so as to obtain iridescent, non-pitted grain surfaces, cooling the grains slowly through an annealing period and preventing detrimental strains being set up therein, and thereafter treating the grains with a chemical reagent capable of removing any silica film thereon.

5. As an abrasive material, substantially pure silicon carbide in loose granular form of commercial grit sizes which has been heat treated at a temperature between 1000° C. and 1400° C. and thereafter slowly cooled and annealed and which has substantially smooth, non-pitted, lustrous surfaces and a strength materially greater than that of the untreated grain.

6. A composition of matter comprising substantially pure silicon carbide in loose granular form and commercial grit sizes which has been heated in its final grit size for at least one hour at a temperature between 1000° and 1400° C. and thereafter cooled slowly and annealed and has substantially smooth, non-pitted, iridescent surfaces and is materially stronger than the unheated grain.

7. An article of manufacture comprising a flexible backing, a coating of a bond thereon and embedded in said bond a layer of substantially pure silicon carbide abrasive grains of commercial grit sizes which have been heat treated at 1000° to 1400° C. and cooled slowly and annealed and are materially stronger than the untreated grains, each grain having a substantially smooth, non-pitted, iridescent surface.

A. ALBERT KLEIN.